US012349264B2

(12) United States Patent
He et al.

(10) Patent No.: US 12,349,264 B2
(45) Date of Patent: Jul. 1, 2025

(54) CONTROL CIRCUIT OF ATMOSPHERIC PLASMA GENERATING DEVICE AND ATMOSPHERIC PLASMA GENERATING SYSTEM

(71) Applicant: Ming Chi University of Technology, New Taipei (TW)

(72) Inventors: Jhih-Yan He, New Taipei (TW); Li-Chun Chang, New Taipei (TW); Jyh-Wei Lee, New Taipei (TW); Ming-Hung Chen, New Taipei (TW)

(73) Assignee: MING CHI UNIVERSITY OF TECHNOLOGY, New Taipei (TW)

( * ) Notice: Subject to any disclaimer, the term of this patent is extended or adjusted under 35 U.S.C. 154(b) by 206 days.

(21) Appl. No.: 18/239,244

(22) Filed: Aug. 29, 2023

(65) Prior Publication Data

US 2025/0008635 A1 Jan. 2, 2025

(30) Foreign Application Priority Data

Jun. 27, 2023 (TW) ................................ 112123870

(51) Int. Cl.
*H05H 1/46* (2006.01)

(52) U.S. Cl.
CPC ........... *H05H 1/46* (2013.01); *H05H 2240/10* (2013.01)

(58) Field of Classification Search
None
See application file for complete search history.

(56) References Cited

U.S. PATENT DOCUMENTS 8,647,585 B2 * 2/2014 Hancock ................ A61N 5/022 422/186.04
8,900,521 B2 * 12/2014 Hancock ............... A61L 2/0011 422/186
9,675,716 B2 * 6/2017 Hancock ................ A61N 5/022
10,651,014 B2 * 5/2020 Roy .................... H01J 37/3255
10,688,204 B2 * 6/2020 Hancock .................. H05H 1/46
10,964,515 B2 * 3/2021 Kwon ............... H01J 37/32449
11,097,022 B2 * 8/2021 Hancock .................. H05H 1/46
2010/0296977 A1 * 11/2010 Hancock ................... A61L 2/24 422/186
2014/0066838 A1 * 3/2014 Hancock ................... A61L 2/24 604/23
2015/0056107 A1 * 2/2015 Hancock ................... A61L 2/24 422/186
2017/0232122 A1 * 8/2017 Hancock ................... A61L 2/14 604/23
2019/0206658 A1 * 7/2019 Roy .................. H01J 37/32348
2020/0171180 A1 * 6/2020 Hancock ................... A61L 2/14
2022/0328461 A1 * 10/2022 Ichikawa ........... H10H 20/8585
2024/0105891 A1 * 3/2024 Nishimori ........... H01L 25/0753
2025/0008635 A1 * 1/2025 He ........................... H05H 1/46

* cited by examiner

*Primary Examiner* — Srinivas Sathiraju
(74) *Attorney, Agent, or Firm* — troutman pepper locke; Tim Tingkang Xia, Esq.

(57) ABSTRACT

Disclosed is a control circuit of an atmospheric plasma generating device, comprising: a power supply suppling power to the control circuit, a switching element, a first set of resistors, a second set of resistors, a set of Zener diodes, a set of transistors electrically coupled to the switching element, the set of Zener diodes, the first set of resistors and the second set of resistors. The control circuit further includes a capacitor, an inductor, and a set of diodes electrically coupled to the first set of resistors or the second set of resistors.

10 Claims, 1 Drawing Sheet

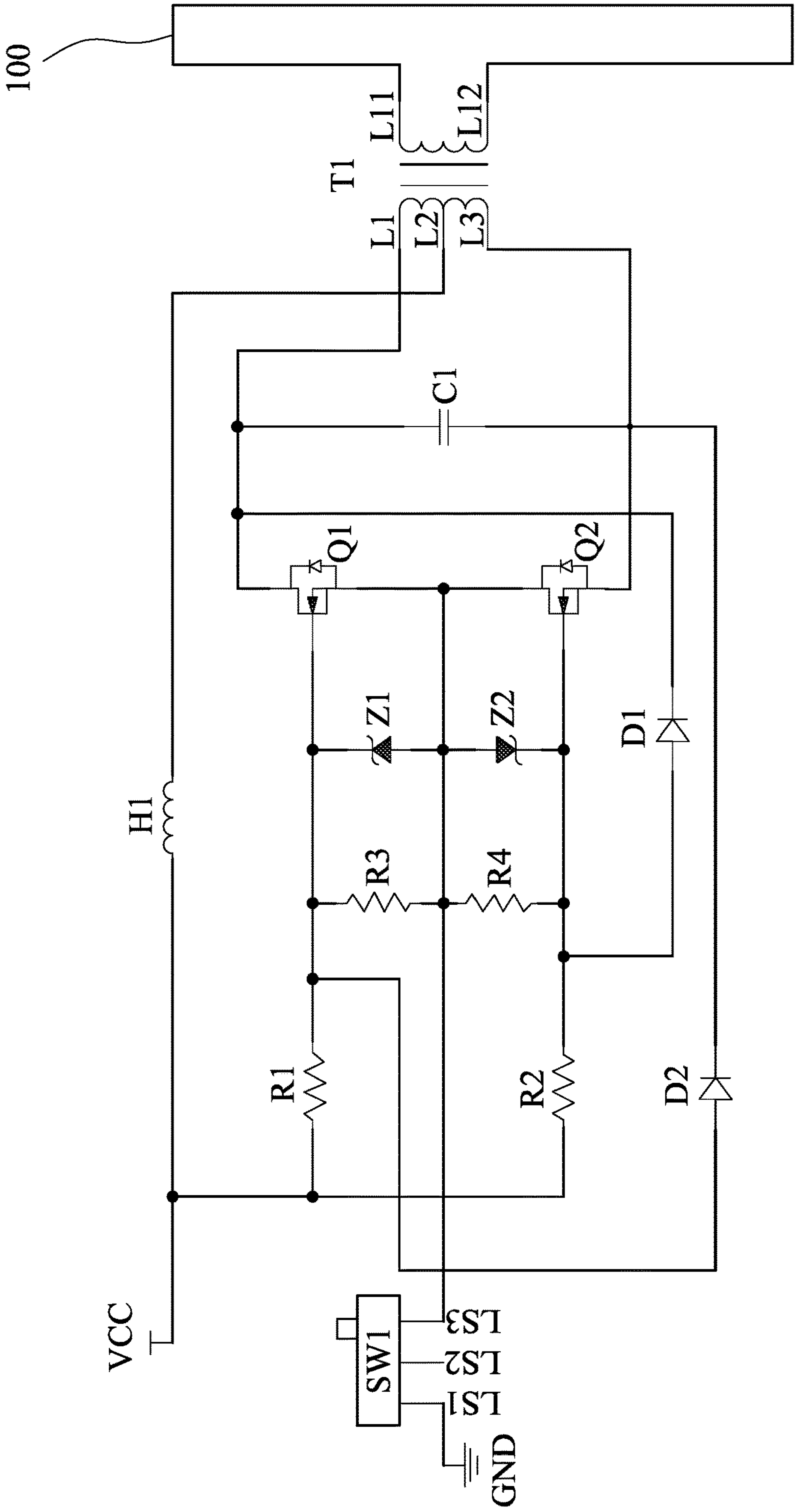
100
L11
L12
T1
L1
L2
L3
C1
Q1
Q2
Z1
Z2
D1
H1
R3
R4
R1
R2
D2
VCC
SW1
LS3
LS2
LS1
GND

CONTROL CIRCUIT OF ATMOSPHERIC PLASMA GENERATING DEVICE AND ATMOSPHERIC PLASMA GENERATING SYSTEM

CROSS-REFERENCE TO RELATED APPLICATION

This application claims the benefit of Taiwan Patent Application No. 112123870, filed on Jun. 27, 2023, which is incorporated by reference herein in its entirety.

FIELD OF THE INVENTION

The present invention relates to a circuit, and more particularly to a control circuit of an atmospheric plasma generating device.

BACKGROUND OF THE INVENTION

Conventionally, in a plasma generation process, the plasma gas that is usually used is argon (Ar) mixed with oxygen ($O_2$) and/or nitrogen ($N_2$). In addition, atmospheric plasma is also one of the technologies that are widely used in the industry.

However, generating atmospheric plasma in a more economical and efficient ways is desirable in the industry.

SUMMARY OF THE INVENTION

The first object of the present invention is to provide a control circuit of an atmospheric plasma generating device, which is disposed on a substrate to control the atmospheric plasma generating device. The control circuit of an atmospheric plasma generating device comprises: a power supply, a switching element, a first set of resistors, a second set of resistors, a set of Zener diodes, a set of transistors, a capacitor, a set of diodes, and an inductor; the power supply suppling power to the control circuit. The switching element is electrically coupled to the set of transistors. The set of transistors are respectively electrically coupled to the set of Zener diodes, the first set of resistors and the second set of resistors. The set of diodes are respectively electrically coupled to the first set of resistors or the second set of resistors. The capacitor is electrically coupled to any one of the set of diodes. The inductor is electrically coupled to the power supply. The control circuit is electrically coupled to the atmospheric plasma generating device through a transformer.

The second object of the present invention is to provide a control circuit of an atmospheric plasma generating device, which is disposed on a substrate to control the atmospheric plasma generating device. The control circuit of an atmospheric plasma generating device comprises: a power supply, a switching element, a first resistor, a second resistor, a third resistor, a fourth resistor, a first Zener diode, a second Zener diode, a first transistor, a second transistor, a capacitor, a first diode, a second diode, an inductor. The power supply supplies power to the control circuit. The switching element is electrically coupled to the first transistor and the second transistor. The first transistor and the second transistor are respectively electrically coupled to the first Zener diode, the second Zener diode, the first resistor, the second resistor, the third resistor and the fourth resistor. The first diode and the second diode are respectively electrically coupled to the first resistor or the second resistor. The capacitor is electrically coupled to any one of the first diode and the second diode. The inductor is electrically coupled to the power supply. The control circuit is electrically coupled to the atmospheric plasma generating device through a transformer.

In one embodiment of the invention, one end of the switching element is electrically coupled to the first transistor and the second transistor, and the other end of the switching element is grounded.

In one embodiment of the invention, the inductor, the first diode and the second diode are connected in parallel.

In one embodiment of the invention, the first resistor and the second resistor are configured to disperse excess voltage into a gate of the first transistor or the second transistor.

In one embodiment of the invention, the third resistor and the fourth resistor are configured to drain excess gate charge on the first transistor or the second transistor.

In one embodiment of the invention, the first Zener diode and the second Zener diode are configured to limit a gate voltage of the first transistor or the second transistor to be less than 12 volts.

In one embodiment of the invention, the capacitor is connected in parallel with the transformer.

In one embodiment of the invention, the first diode and the second diode are configured to change the on or off state of the first transistor and the second transistor. A source region of the first transistor is turned on, and a cathode of the first diode is equivalent to being grounded by the first transistor. Simultaneously, the first diode is in the forward-biased state, so that a gate of the second transistor that was originally turned on is grounded, and the second transistor is off and not biased.

The third object of the present invention is to provide an atmospheric plasma generation system. The atmospheric plasma generation system comprises: an atmospheric plasma generating device; a transformer electrically coupled to the atmospheric plasma generating device; and a control circuit that is disposed on a substrate and electrically coupled to the transformer and controls the atmospheric plasma generating device. The control circuit includes: a power supply for supplying power to the control circuit; an inductor electrically coupled to the power supply; a first switching circuit composed of a first transistor, a first Zener diode, a first resistor, a third resistor, a first diode and a capacitor that are electrically coupled to each other. The first diode is connected in series with the capacitor, and the first diode is electrically coupled to the first resistor and the third resistor. The control circuit also includes: a second switching circuit composed of a second transistor, a second Zener diode, a second resistor, a fourth resistor, and a second diode that are electrically coupled to each other. The second diode is connected in parallel with the first diode, and the second diode is electrically coupled to the second resistor and the fourth resistor. The control circuit also further includes: a switching element that is electrically coupled to the first transistor and the second transistor.

Embodiments of the present invention will now be described, by way of example only, with reference to the accompanying drawings.

BRIEF DESCRIPTION OF THE DRAWINGS

FIG. 1 depicts a control circuit diagram of an atmospheric plasma generating device according to an embodiment of the present invention.

DETAILED DESCRIPTION OF THE PREFERRED EMBODIMENTS

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

First of all, it noted that FIG. 1 depicts a control circuit diagram of an atmospheric plasma generating device according to an embodiment of the present invention. As shown in FIG. 1, an embodiment of the present invention shows that a control circuit is disposed on a substrate to control an atmospheric plasma generating device 100. The control circuit at least includes: a power supply VCC, a switching element SW1, a first set of resistors (R1, R3), a second set of resistors (R2, R4), a set of Zener diodes (Z1, Z2), a set of transistors (Q1, Q2), a capacitor C1, a set of diodes (D1, D2) and an inductor H1. Alternatively, i3en other embodiments, the control may include other active or passive components. It should be particularly noted however that the resistors R1 and R2 perform the function of consuming voltage sources so as to disperse excess voltage into gates of transistor Q1 and transistor Q2 in the control circuit. In an exemplary embodiment of the present invention, the transistor Q1 and the transistor Q2 may be metal oxide semiconductor field effect transistors (MOSFETs).

In addition, in the embodiment of the present invention, Zener diode Z1 and Zener diode Z2 work at a pinning range of 12 volts, so the voltage flowing through the control circuit is controlled by Zener diode Z1 and Zener diode Z2 and is pinned to be less than 12 volts. In an exemplary embodiment of the present invention, if the input voltage is between 12V and 40V, the redundant voltage range is between 0 and 28V. The current calculated according to Ohm's law (i.e., I=V/R) that flows through the control circuit is controlled to range from 0.05 A to 0.1 A. The power ranges between 1.4 W and 2.8 W. In an exemplary embodiment of the present invention, the resistance values of the resistors R1 and R2 are between 30002 and 55002, and the power range is from 2 W to 10 W.

Additionally, in an exemplary embodiment of the present invention, the Zener diode Z1 and the Zener diode Z2 possess functional characteristics of limiting the voltage. That is, the Zener diode Z1 and the Zener diode Z2 limit the voltage flowing through the gates of the transistor Q1 and the transistor Q2 to 12 volts maximum in the control circuit. In doing so, the Zener diode Z1 and the Zener diode Z2 serve as a protection element of the control circuit to prevent transistor Q1 and transistor Q2 from being damaged, burned, and exploded. The maximum steady-state power output (or the so-called "Max. Steady State Power Dissipation") of the transistor Q1 and transistor Q2 is between 1 W and 3 W. The steady-state power output (or the so-called "Steady State Power Dissipation") ranges between 1 W and 3 W. The voltage range of the Zener diode (or the so-called "Zener Voltage Range") is from −3.3V to 200V. The operating voltage of the Zener diode (or the so-called "Zener Voltage Nom") is 12V.

Furthermore, one exemplary embodiment of the present invention shows that the diode D1 and the diode D2 provide the functional characteristics of forward conduction and reverse cut-off, and such functions in the control circuit disclosed herein are exemplified as follows. When the source of the transistor Q1 is turned on, the cathode of the diode D2 is equivalent to being grounded by the transistor Q1. Meanwhile, a forward conducting current flows through the diode D2, so that the transistor Q2 is turned off because the gate of the transistor Q2 that was originally turned on is grounded. At the same time, the capacitor C1 is charged while the capacitor C1 and the transformer T1 is electrically connected in parallel, and the circuit is implemented as an L-C oscillating circuit where the capacitor C1 discharges the transformer T1. When the capacitor C1 is nearly discharged, the primary coil of the transformer T1 charges the capacitor C1, and they resonate with each other. When the capacitor C1 discharges the primary coil of the transformer T1, the source of the transistor Q1 is turned on while the diode D2 is cut off, and then the transistor Q2 is turned on again. The conduction of the transistor Q2 results in that the negative pole of the diode D1 is pulled down, and the conduction of the diode D1 turns the conduction of the transistor Q1 into a cut-off. Such an operation serving as a working cycle progresses repeatedly, so that the primary coil of the transformer T1 generates an alternating magnetic field induction to the ferromagnetic core in the transformer, and then is induced by the secondary coil of the transformer T1 to generate a voltage (or current) source output to the load. As to the transistor Q1 and transistor Q2, VDSS thereof range between 200V and 500V; $R_{DS(on)}$ thereof range from 0.07552 to 0.40052; ID thereof range between 10 A and 50 A.

Additionally, an exemplary embodiment of the present invention shows that the maximum recurrent peak reverse voltage of the diode D1 and diode D2 ranges between 100V and 1000V. The maximum RMS voltage ranges between 100V and 700V. The maximum DC blocking voltage ranges between 100V and 1000V. When TC ranges from 75° C. to 100° C., the maximum average forward rectified current ranges between 1.0 A and 20.0 A. The maximum instantaneous forward voltage ranges between 1V and 3V at a current of 1.0 A to 20.0 A.

In addition, an exemplary embodiment of the present invention discloses that the capacitor C1 in the control circuit mainly blocks direct current, so that alternating current can flow through the capacitor as well as charge and discharge. For example, the capacitor C1 may be MKP, MKPH that are metallized polypropylene film capacitor type capacitors. Capacitance value thereof ranges from 0.27 μF to 5.00 μF. Withstand voltage thereof ranges from 630 VAC to 1200 VAC, or from 630 VDC to 1200 VDC.

In an exemplary embodiment of the present invention, the power supply VCC mainly supplies power to the control circuit, and may further supply power to a transformer T1 or the atmospheric plasma generating device 100. It should be noted here that the inductor H1 (or "choke coil") will generate an electromotive force because the amount of change in a passing current thereof, thereby resisting the change of the current and flowing into the center tap of the transformer T1. Inductor H1 is utilized to prevent the circuit from consuming too much current when it starts up so as to protect it. In an exemplary embodiment of the present invention, the inductance of the inductor H1 ranges between 50 uH and 1000 uH, and the withstand current ranges between 10 A and 20 A. In exemplary embodiments of the present invention, the inductor T1 has the function of boosting the voltage at a high frequency in the working environment, and the input voltage of the inductor T1 ranges between 30V and 100V; the output voltage ranges between 30 kV and 100 kV; the working frequency ranges between 20 kHz and 200 kHz; the inductance of the primary coil ranges between 0.68 mH and 10 mH; the inductance of the secondary coil ranges between 7.50H and 75H; and the magnetic core is made of ferromagnetic core material.

In exemplary embodiments of the present invention, the resistor R3 and the resistor R4 have the functional characteristics of consuming the voltage source. The resistor R3 and the resistor R4 are utilized in the control circuit to deplete the excess gate charge on the transistor Q1 and transistor Q2 because there may be parasitic capacitance in the transistor Q1 and transistor Q2, which is formed due to the separation of mobile charges in various regions within the structure. It is noted herein that parasitic capacitance is an unnecessary component in the circuit, which will be ignored when working at low frequency; but it cannot be avoided when working in high frequency radio frequency circuit, so we must pay attention to parasitic capacitance when designing. The impedance of a capacitor is 1/jωC, which is considered infinite at low frequencies. Although it does not affect the circuit, when the frequency increases, the capacitor in the circuit behaves like an impedance. It can change the behavior of the transistor by limiting the speed thereof. In exemplary embodiments of the present invention, the resistors are added to overcome the drawbacks of the transistor working at high-frequency. The resistance values of the resistors R3 and R4 are, for example, 10Ω, and the power range ranges, for example, between ½ W and 2 W.

In an exemplary embodiment of the present invention, the switching element SW1 is electrically coupled to the group of transistors (Q1, Q2) through a wire LS3. In the embodiment of the present invention, the switching element SW1 serves as a functional characteristic element that is turned on or off when the circuit inputs a current source, and the withstand voltage of the switching element SW1 ranges between 100V and 380V; the withstand current ranges between 1 A and 20 A. In an exemplary embodiment of the present invention, the switching element SW1 is grounded (GND) through the wire LS1. Furthermore, the switching element SW1 is connected to other electronic elements through the wire LS2.

In an exemplary embodiment of the present invention, the set of transistors (Q1, Q2) are respectively electrically coupled to the set of regulator transistors (Z1, Z2), the first set of resistors (R1, R3) and the second set of resistors (R2, R4).

In an exemplary embodiment of the present invention, the set of diodes are respectively electrically coupled to the first set of resistors (R1, R3) or the second set of resistors (R2, R4).

In an exemplary embodiment of the present invention, the capacitor C1 may be electrically coupled to any one of the set of diodes (D1, D2).

In an exemplary embodiment of the present invention, the inductor H1 is electrically coupled to the power supply VCC.

In an exemplary embodiment of the present invention, the control circuit is electrically coupled to the atmospheric plasma generating device 100 through a transformer T1. Furthermore, the inductor H1 is electrically coupled to the transformer T1 through the wire L2. The first transistor Q1 is electrically coupled to the transformer T1 through the wire L1. The second transistor Q2 is electrically coupled to the transformer T1 through the wire L3. Additionally, the transformer T1 is electrically coupled to the atmospheric plasma generating device 100 through wires L11 and L12.

Next, as shown in FIG. 1, an atmospheric plasma generating system disclosed in an exemplary embodiment of the present invention includes: an atmospheric plasma generating device 100, a transformer T1 electrically coupled to the atmospheric plasma generating device 100, and a control circuit.

In an exemplary embodiment of the present invention, the control circuit is placed on a substrate (not shown) and electrically coupled to the transformer T1 to control the atmospheric plasma generating device 100. The control circuit at least includes: a power supply VCC, an inductor H1, a first switching circuit, a second switching circuit, and a switching element SW1.

In an exemplary embodiment of the present invention, the power supply VCC supplies power to the control circuit.

In an exemplary embodiment of the present invention, the inductor H1 is electrically coupled to the power supply VCC.

In an exemplary embodiment of the present invention, the first switching circuit is composed of a first transistor Q1, a first Zener diode Z1, a first resistor R1, a third resistor R3, a first diode D2 and a capacitor C1, which are electrically connected to each other. In an exemplary embodiment of the present invention, the first diode D2 is electrically connected with the capacitor C1 in series, and the first diode D2 is electrically coupled to the first resistor R1 and the third resistor R3.

In an exemplary embodiment of the present invention, the second switching circuit is composed of the second transistor Q2, the second Zener diode Z2, the second resistor R2, the fourth resistor R4 and the second diode D1, which are electrically connected to each other. In an exemplary embodiment of the present invention, the second diode D1 is electrically connected with the first diode D2 in parallel, and the second diode D1 is electrically coupled to the second resistor R2 and the fourth resistor R4. In an exemplary embodiment of the present invention, the switching element SW1 is electrically coupled to the first transistor Q1 and the second transistor Q2.

In an exemplary embodiment of the present invention, one end of the switching element SW1 is electrically coupled to the first transistor Q1 and the second transistor Q2, and the other end of the switching element SW1 is grounded (GND).

In an exemplary embodiment of the present invention, the inductor H1, the first diode D2 and the second diode D1 are electrically connected in parallel.

In an exemplary embodiment of the present invention, the first resistor R1 and the second resistor R2 are configured to disperse excess voltage entering the gate of the first transistor Q1 or the second transistor Q2.

In an exemplary embodiment of the present invention, the third resistor R3 and the fourth resistor R4 are configured to drain excess gate charges on the first transistor Q1 or the second transistor Q2.

In an exemplary embodiment of the present invention, the first Zener diode Z1 and the second Zener diode Z2 are configured to limit the gate voltage of the first transistor or the second transistor to below 12 volts.

In an exemplary embodiment of the present invention, the capacitor C1 is electrically connected with the transformer T1 in parallel.

In an exemplary embodiment of the present invention, the first diode D2 and the second diode D1 are configured to make the first transistor Q1 and the second transistor Q2 turn on or off. In the exemplary embodiment of the present invention, when the source of the first transistor Q1 is turned on, the cathode of the first diode D2 is equivalent to being grounded by the first transistor Q1, while a forward conduction current passes through the first diode D2, thereby making the gate of the second transistor Q2 which is turned on be grounded, and the second transistor Q2 is turned off and not turned on.

Referring to FIG. 1 again, another exemplary embodiment of the present invention discloses that the atmospheric plasma generating system includes: an atmospheric plasma generating device 100, a transformer T1 electrically coupled to the atmospheric plasma generating device 100, and a control circuit. The control circuit is placed on a substrate (not shown) and electrically coupled to the transformer T1 to control the atmospheric plasma generating device 100. The control circuit includes: a power supply VCC, an inductor H1, a first switching circuit, a second switching circuit and a switching element SW1.

In an exemplary embodiment of the present invention, the power supply VCC supplies power to the control circuit.

In an exemplary embodiment of the present invention, the inductor H1 is electrically coupled to the power supply VCC.

In an exemplary embodiment of the present invention, the first switching circuit is composed of a first transistor Q1, a first Zener diode Z1, a first resistor R1, a third resistor R3, a first diode D2 and a capacitor C1, which are electrically connected to each other. It is noted herein that the first diode D2 is electrically connected with the capacitor C1 in series, and the first diode D2 is electrically coupled to the first resistor R1 and the third resistor R3.

In an exemplary embodiment of the present invention, the second switching circuit is composed of the second transistor Q2, the second Zener diode Z2, the second resistor R2, the fourth resistor R4 and the second diode D1, which are electrically connected to each other. The second diode D1 is connected with the first diode D2 in parallel, and the second diode D1 is electrically coupled to the second resistor R2 and the fourth resistor R4. Furthermore, the switching element SW1 is electrically coupled to the first transistor Q1 and the second transistor Q2.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A control circuit of an atmospheric plasma generating device, disposed on a substrate to control the atmospheric plasma generating device, comprising: a power supply, a switching element, a first set of resistors, a second set of resistors, a set of Zener diodes, a set of transistors, a capacitor, a set of diodes, and an inductor; the power supply suppling power to the control circuit; the switching element being electrically coupled to the set of transistors; the set of transistors being respectively electrically coupled to the set of Zener diodes, the first set of resistors and the second set of resistors; the set of diodes being respectively electrically coupled to the first set of resistors or the second set of resistors; the capacitor being electrically coupled to any one of the set of diodes; the inductor being electrically coupled to the power supply; and the control circuit being electrically coupled to the atmospheric plasma generating device through a transformer.

2. A control circuit of an atmospheric plasma generating device, disposed on a substrate to control the atmospheric plasma generating device, comprising: a power supply, a switching element, a first resistor, a second resistor, a third resistor, a fourth resistor, a first Zener diode, a second Zener diode, a first transistor, a second transistor, a capacitor, a first diode, a second diode, an inductor; the power supply suppling power to the control circuit; the switching element being electrically coupled to the first transistor and the second transistor; the first transistor and the second transistor being respectively electrically coupled to the first Zener diode, the second Zener diode, the first resistor, the second resistor, the third resistor and the fourth resistor; the first diode and the second diode being respectively electrically coupled to the first resistor or the second resistor; the capacitor being electrically coupled to any one of the first diode and the second diode; the inductor being electrically coupled to the power supply; and the control circuit being electrically coupled to the atmospheric plasma generating device through a transformer.

3. The control circuit of an atmospheric plasma generating device as claimed in claim 2, wherein one end of the switching element is electrically coupled to the first transistor and the second transistor, and the other end of the switching element is grounded.

4. The control circuit of an atmospheric plasma generating device as claimed in claim 2, wherein the inductor, the first diode and the second diode are connected in parallel.

5. The control circuit of an atmospheric plasma generating device as claimed in claim 2, wherein the first resistor and the second resistor are configured to disperse excess voltage into a gate of the first transistor or the second transistor.

6. The control circuit of an atmospheric plasma generating device as claimed in claim 2, wherein the third resistor and the fourth resistor are configured to drain excess gate charge on the first transistor or the second transistor.

7. The control circuit of an atmospheric plasma generating device as claimed in claim 2, wherein the first Zener diode and the second Zener diode are configured to limit a gate voltage of the first transistor or the second transistor to be less than 12 volts.

8. The control circuit of an atmospheric plasma generating device as claimed in claim 2, wherein the capacitor is connected in parallel with the transformer.

9. The control circuit of an atmospheric plasma generating device as claimed in claim 2, wherein the first diode and the second diode are configured to change the on or off state of the first transistor and the second transistor; when a source of the first transistor is turned on, a cathode of the first diode is equivalent to being grounded by the first transistor; simultaneously, the first diode is in the forward-biased state, so that a gate of the second transistor that was originally turned on is grounded, and the second transistor is off and not biased.

10. An atmospheric plasma generation system, comprising:

an atmospheric plasma generating device;

a transformer electrically coupled to the atmospheric plasma generating device; and a control circuit, disposed on a substrate and electrically coupled to the transformer, to control the atmospheric plasma generating device, the control circuit including:

a power supply for supplying power to the control circuit;

an inductor electrically coupled to the power supply;

a first switching circuit composed of a first transistor, a first Zener diode, a first resistor, a third resistor, a first diode and a capacitor that are electrically coupled to each other, wherein the first diode is connected in series with the capacitor, and the first diode is electrically coupled to the first resistor and the third resistor;

a second switching circuit composed of a second transistor, a second Zener diode, a second resistor, a fourth resistor, and a second diode that are electrically coupled to each other, wherein the second diode is connected in parallel with the first diode, and the second diode is electrically coupled to the second resistor and the fourth resistor; and a switching element that is electrically coupled to the first transistor and the second transistor.

* * * * *